US012567710B2

(12) United States Patent
Menez et al.

(10) Patent No.: US 12,567,710 B2
(45) Date of Patent: Mar. 3, 2026

(54) SECURED HIGH POWER CONNECTOR ASSEMBLY AND PROCESS OF ASSEMBLY

(71) Applicant: Aptiv Technologies AG, Schaffhausen (CH)

(72) Inventors: Frédéric Menez, Hermeray (FR); Jean Fabre, Chartres (FR)

(73) Assignee: Aptiv Technologies AG, Schaffhausen (CH)

( * ) Notice: Subject to any disclaimer, the term of this patent is extended or adjusted under 35 U.S.C. 154(b) by 271 days.

(21) Appl. No.: 18/370,154

(22) Filed: Sep. 19, 2023

(65) Prior Publication Data

US 2024/0097392 A1 Mar. 21, 2024

(30) Foreign Application Priority Data

Sep. 19, 2022 (EP) .................................... 22196429

(51) Int. Cl.
*H01R 43/26* (2006.01)
*H01R 13/631* (2006.01)

(52) U.S. Cl.
CPC ........... *H01R 43/26* (2013.01); *H01R 13/631* (2013.01); *H01R 2201/26* (2013.01)

(58) Field of Classification Search
CPC ............. H01R 13/631; H01R 13/6271; H01R 13/641; H01R 43/26; H01R 2201/26
USPC ......................................... 439/304, 352, 489
See application file for complete search history.

(56) References Cited

U.S. PATENT DOCUMENTS 7,641,499 B1 * 1/2010 George ................. B60L 3/0069 439/352
8,323,046 B1 * 12/2012 Daugherty ........... H01R 13/639 439/352
2012/0302084 A1 * 11/2012 Daugherty ........... H01R 13/639 439/352

FOREIGN PATENT DOCUMENTS

| | | | |
|---|---|---|---|
| CN | 105723572 | B | 8/2018 |
| EP | 2510592 | B1 | 9/2019 |
| EP | 3687005 | A1 | 7/2020 |
| WO | 2015140821 | A1 | 9/2015 |
| WO | 2015140821 | A9 | 12/2015 |

OTHER PUBLICATIONS

Extended European Search Report for Application No. 22196429.9; Mailed Mar. 2, 2023; 29 pages.

* cited by examiner

*Primary Examiner* — Gary F Paumen
(74) *Attorney, Agent, or Firm* — Billion & Armitage

(57) ABSTRACT

An electrical connector assembly includes a connector, a counter-connector, and a dedicated tool for disassembling the connector and the counter-connector. The connector includes primary and secondary locking means, at least one of which being at least partially covered by a protecting wall configured so as to have an insertion opening, wherein a key portion of the dedicated tool can be inserted. The insertion opening has a shape which is complementary and/or adjusted to the key portion. A process for unmating the connector and the counter-connector is also presented.

8 Claims, 5 Drawing Sheets

SECURED HIGH POWER CONNECTOR ASSEMBLY AND PROCESS OF ASSEMBLY

CROSS-REFERENCE TO RELATED APPLICATION

This application claims the benefit of and priority to European Patent Application No. 22196429.9, titled "Secured High Power Connector Assembly and Process of Assembly", filed Sep. 19, 2022, the contents of which are incorporated by reference herein.

TECHNICAL FIELD OF THE INVENTION

The present disclosure relates to the field of vehicle connectivity, and in particular but not exclusively, to the field of high-power connectivity.

BACKGROUND

When connectors are used in high voltage applications, e.g., greater than 48 volts, it is desirable to prevent accidental contact with energized terminals. Prior art solutions have used interlock circuits that prevent terminals from being energized until after the interlock circuit is completed by the proper mating of the connector assembly. Such interlock circuits are disclosed, for example in U.S. Pat. No. 8,192,212 B2. The interlock circuits are configured so that the terminals of the interlock circuits are disconnected before the power terminals. This ensures that if the power connectors are unmated, the interlock circuit will be open and doing so will give the signal to disconnect the power supply before the power terminals are themselves disconnected.

However, an interlock circuit requires more complex connectors, a control circuit, additional components, and an additional control function, which creates additional costs that one would like to avoid.

Further, there are situations where interlock circuits are not required. Such situations occur, for example, when sufficient security is provided in other ways. This is the case, for example, if a connector assembly is protected by a cutout switch, or if the connector assembly is protected by an enclosure that cannot be opened without first disconnecting the high-power supply to the connector assembly. One can also notice that for applications that do not require voltages above 400 Volts for example, the terminal dimensions allow connectors to be mated without the need for screws to facilitate connection. Then, connector assembly could be used without cutout switch if they were safer to disconnect.

Connector assemblies (but not for high-power applications) that necessitate a tool to be disconnected (e.g., CN 105723572 B, EP 3687005 A1, and EP 2510592 B1) are known.

SUMMARY

The present disclosure discloses a solution for providing more security. The present disclosure provides a high-power electrical connector assembly comprising a connector and a counter-connector, the connector and the counter-connector being configured to be mated together, the connector including a connector housing for accommodating at least one terminal and a secondary locking device, wherein the connector housing includes a locking beam providing a primary locking means for locking the connector and the counter-connector to each other, and wherein the secondary locking device is movable, along a direction of movement, between a first position and a second position, the secondary locking device providing, when in its second position, a secondary locking means of the connector and the counter-connector to each other, wherein the electrical connector assembly comprises a dedicated tool for disassembling the connector and the counter-connector, wherein at least one of the primary and secondary locking means are at least partially covered by a protecting wall, the protecting wall being configured so as to have an insertion opening, and wherein the insertion opening has a shape complementary, adjusted and configured for a key portion of the dedicated tool to be inserted therein, in that the secondary locking device is a CPA device, and in that, when in its second position, the CPA device prevents the key portion rom interacting with the locking beam.

Indeed, the dedicated tool and its key portion prevent the connector assembly from being unmated by a person who is not aware of the risks of electrocution and/or of electric arc and/or any other dangerous consequences of improper handling of the connector assembly. The assembly may only be unmated by a professional who is in possession of the dedicated tool. In other words, such a professional is most likely a skilled and qualified person who has been trained and is aware of the safety procedures.

The connector assembly according to the present disclosure may possibly include any of the following features, considered separately or each combined one with one or more others:

- wherein the dedicated tool is removable from the connector;
- the connector housing includes a bridge over the CPA device, the bridge having a window to allow the key portion to interact with the locking beam and a protecting wall covers the window so as to prevent a tool different from the dedicated tool from being directly inserted in the window;
- the protecting wall forms a tunnel covering the window and extending longitudinally parallel to the direction of movement of the CPA device, the insertion opening being located at an end of the tunnel;
- the dedicated tool is rotatable about a rotation axis which is parallel to the direction of movement of the CPA device;
- the locking beam comprises a pivot portion, a locking portion and an actuating portion, respectively located on opposite sides of the pivot portion the pivot portion being configured so that the locking portion disengages from a lug formed on the counter-connector, when the key portion of the dedicated tool presses the actuating portion.

According to another aspect, the present disclosure provides a process for unmating a high-power connector from a counter-connector secured to each other by primary locking means and secondary locking means, the first locking means including a locking beam, the process comprising a step of inserting along an insertion direction, a dedicated tool having a key portion, into an insertion opening made in the connector, wherein the secondary locking means are formed by a CPA device, and comprising the steps of:

- moving a CPA device, along a direction of movement, between a second position and a first position, the CPA device providing, when in its second position, a secondary locking means of the connector and the counter-connector to each other,
- unlocking the first locking means with the dedicated tool, when the CPA device is in the first position.

Possibly, the step of unlocking with the dedicated tool the primary locking means comprises rotating the dedicated tool about a rotation axis parallel to the insertion axis, so that the dedicated tool interacts with the primary locking means for unlocking the connector and the counter-connector.

BRIEF DESCRIPTION OF THE DRAWINGS

The present invention is now described, by way of example with reference to the accompanying drawings, in which.

In this document, the term "counter-connector" generally and broadly designates any element intended to be electrically connected to a connector. It can therefore be another connector, a housing on which connection components are assembled, a wall through which an electrical connection must be made, etc.

On the figures, the same reference numbers designate identical or similar elements.

In this document, the terms "above", "below", "upper", "lower" etc. are purely conventional and refer where applicable to the orientations as shown on the figures.

DETAILED DESCRIPTION

A non-limiting example of an embodiment of a connector assembly 1 is illustrated in FIGS. 1 to 8. Alternative embodiments of connector assemblies can be envisioned, one of which will be disclosed below in connection with FIGS. 9 to 11.

Figure 1:
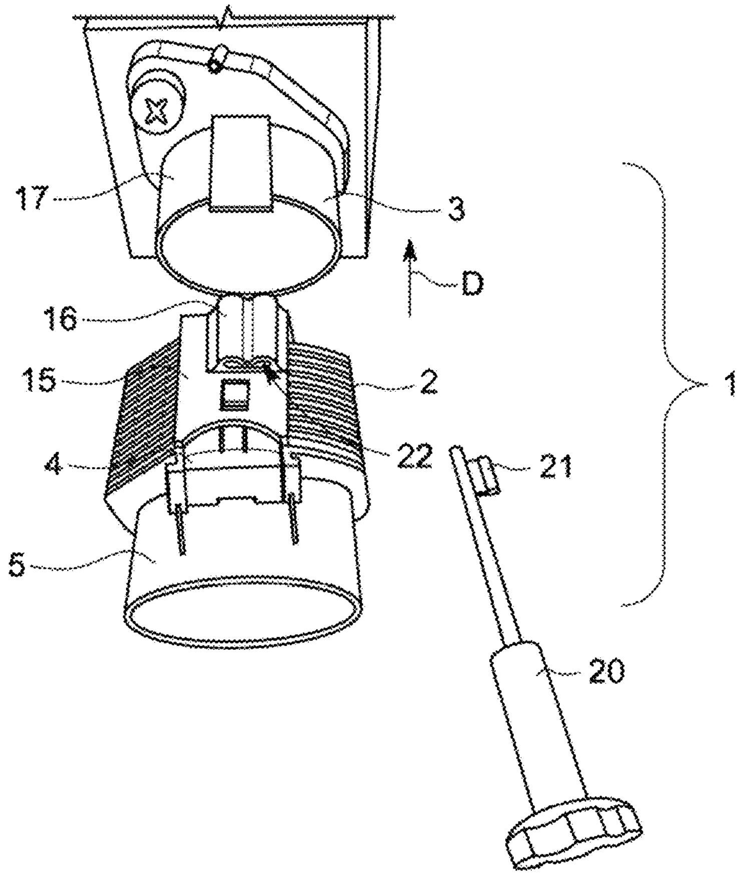
FIG. 1 is an isometric view of an embodiment example of a connector assembly including a connector, a counter-connector, and a dedicated tool; the connector and counter-connector being unmated according to some embodiments.
Figure 2:
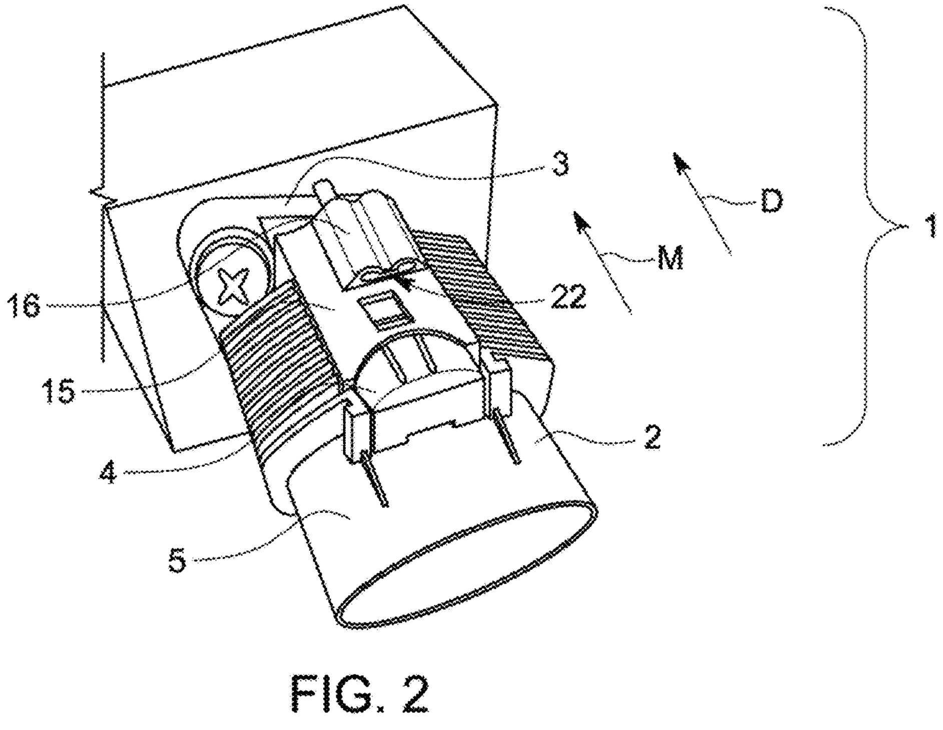
FIG. 2 is an isometric view of the connector assembly shown in FIG. 1, the connector and counter-connector being mated according to some embodiments.
Figure 3:
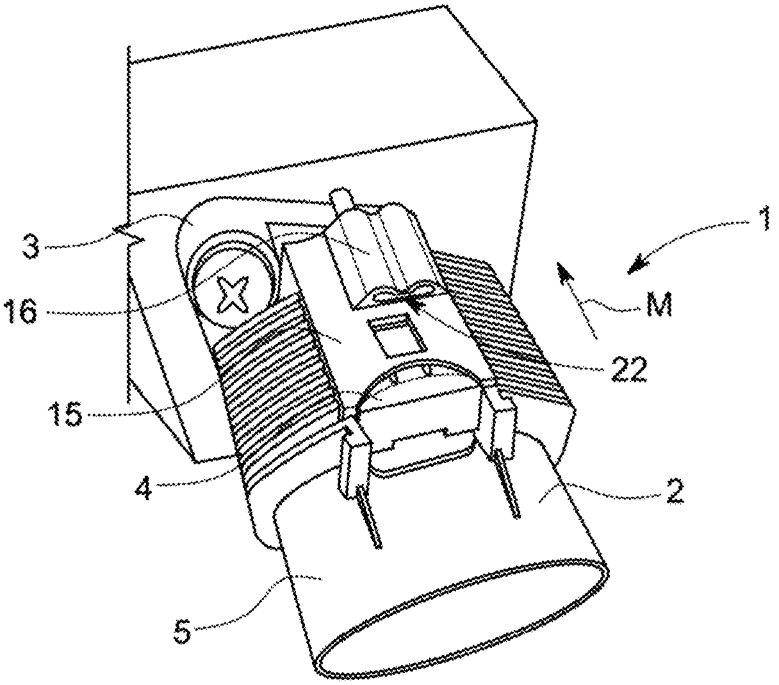
FIG. 3 is an isometric view of the connector assembly shown in FIGS. 1 and 2, the connector and counter-connector being mated and the CPA device being in the second position (i.e., secondary locking position) according to some embodiments.
Figure 4:
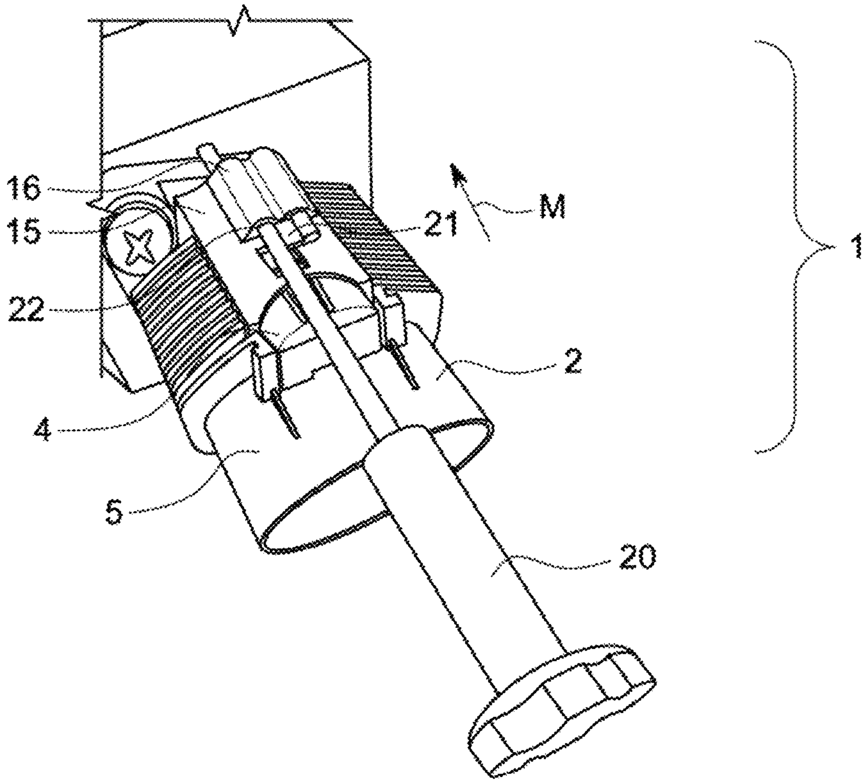
FIG. 4 is an isometric view of the connector assembly shown in FIGS. 1 to 3, the connector and counter-connector being mated, the CPA device being in the first position (i.e., unlocking position) and the dedicated tool being partially engaged below a protecting wall according to some embodiments.

The electrical connector assembly 1 of FIGS. 1 to 8 includes a connector 2, a counter-connector 3 and a CPA device. The acronym "CPA" stands for Connector Position Assurance". CPA devices 4 are well known by the skilled persons. The connector 2 and the counter-connector 3 are shown in an unmated condition in FIG. 1 and in a mated condition in FIG. 3. The connector 2 and the counter-connector 3 of FIG. 2 are also mated, but the CPA device 4 is shown in the first position. A CPA device 4 is usually movable between a first position and a second position. In the first or initial position or unlocking position, the CPA device 4 allows the connector 2 and counter-connector 3 to be mated or unmated. In the second or final position, the CPA device 4 provides secondary locking means, for locking the connector 2 and the counter-connector 3 to each other. The CPA device 4 cannot be moved from the first position to the second position if the connector 2 and the counter-connector 3 are not properly mated.

The connector 2 includes a connector housing 5 essentially made of a molded plastic material. In the illustrated example, the connector housing 5 may also support electromagnetic shield elements (not shown). At least one terminal is accommodated in the connector housing 5. The example of connector housing 5 which is illustrated in FIGS. 1 to 5 and 7 is configured for accommodating two terminals, but they are not shown.

Figure 8:
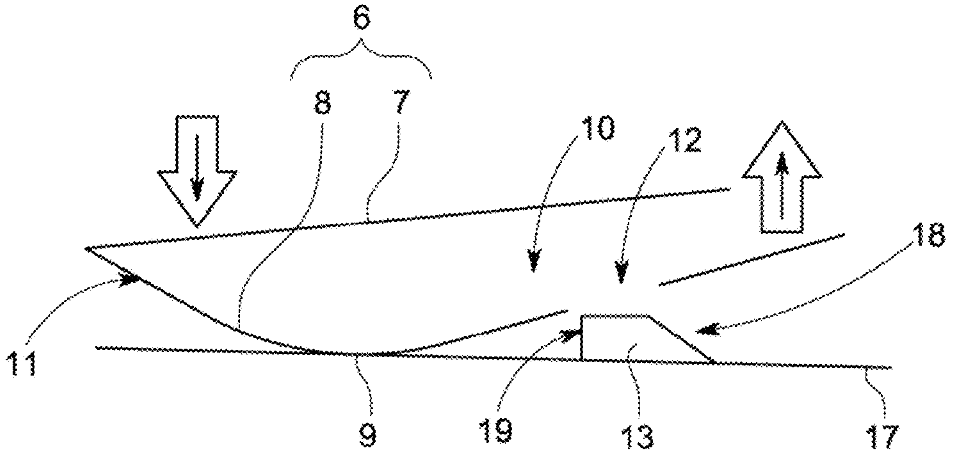
FIG. 8 is a schematic diagram illustrating the movement of the locking beam of the connector of FIGS. 1 to 5 and 7, when the dedicated tool unlocks the primary locking means according to some embodiments.

The connector housing 5 also includes a locking beam 6 providing a primary locking means of the connector 2 and the counter-connector 3 to each other. The locking beam 6 can have various shapes. For example, the locking beam 6 has two branches 7, 8: An upper branch 7 which is elastically connected to the connector housing 5 and a lower branch 8 which is elastically connected to the upper branch 7. As schematically illustrated in FIG. 8, the lower branch 8 includes a pivot portion 9, a locking portion 10 and an actuating portion 11. The locking portion 10 and the actuating portion 11 are each respectively located on opposite sides of the pivot portion 9. The locking portion 10 cooperates with an element of the counter-connector 3 for forming primary locking means. For example, the locking portion 10 includes a slot 12 which is configured for engaging, when the connector 2 and the counter-connector 3 are mated, a lug 13 formed on the counter-connector 3. When in its second position, the CPA device 4 cooperates with the locking beam 6 so as to prevent the slot 12 from disengaging from the lug 13. For example, the CPA device 4 has ramps that cooperate with lateral wings located on both sides of the locking beam 6 (i.e., the locking beam 6 being considered in its longitudinal direction).

Figure 5:
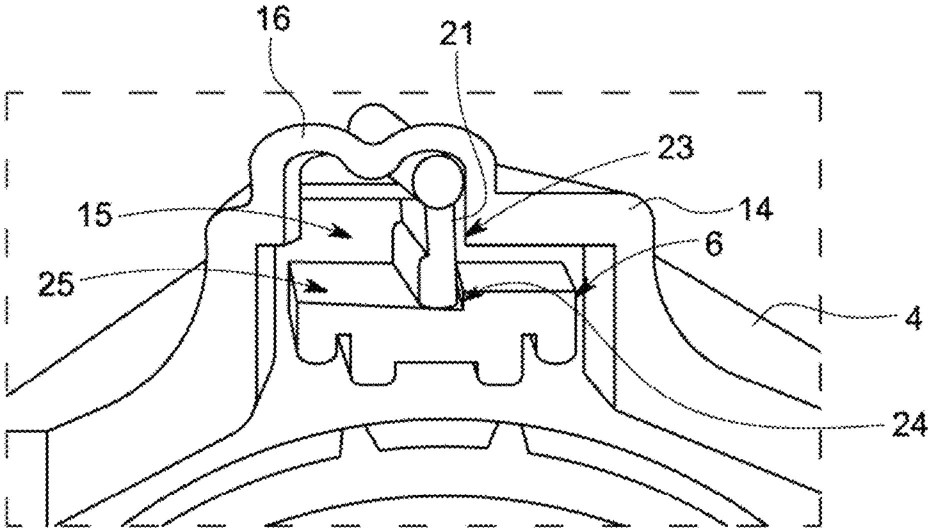
FIG. 5 is an isometric view of the connector of the assembly shown in FIGS. 1 to 4; this connector is viewed in direction of its mating interface (the counter-connector being removed) according to some embodiments.
Figure 6:
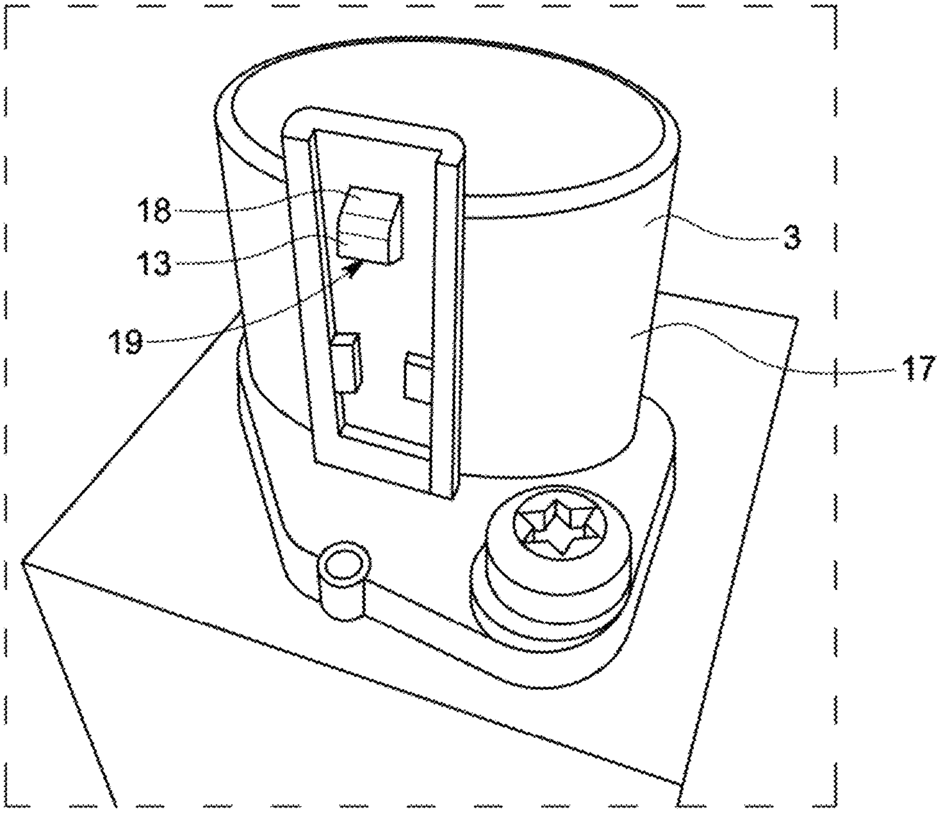
FIG. 6 is an isometric view of the counter-connector of the assembly shown in FIGS. 1 to 4 (the connector being removed) according to some embodiments.
Figure 7:
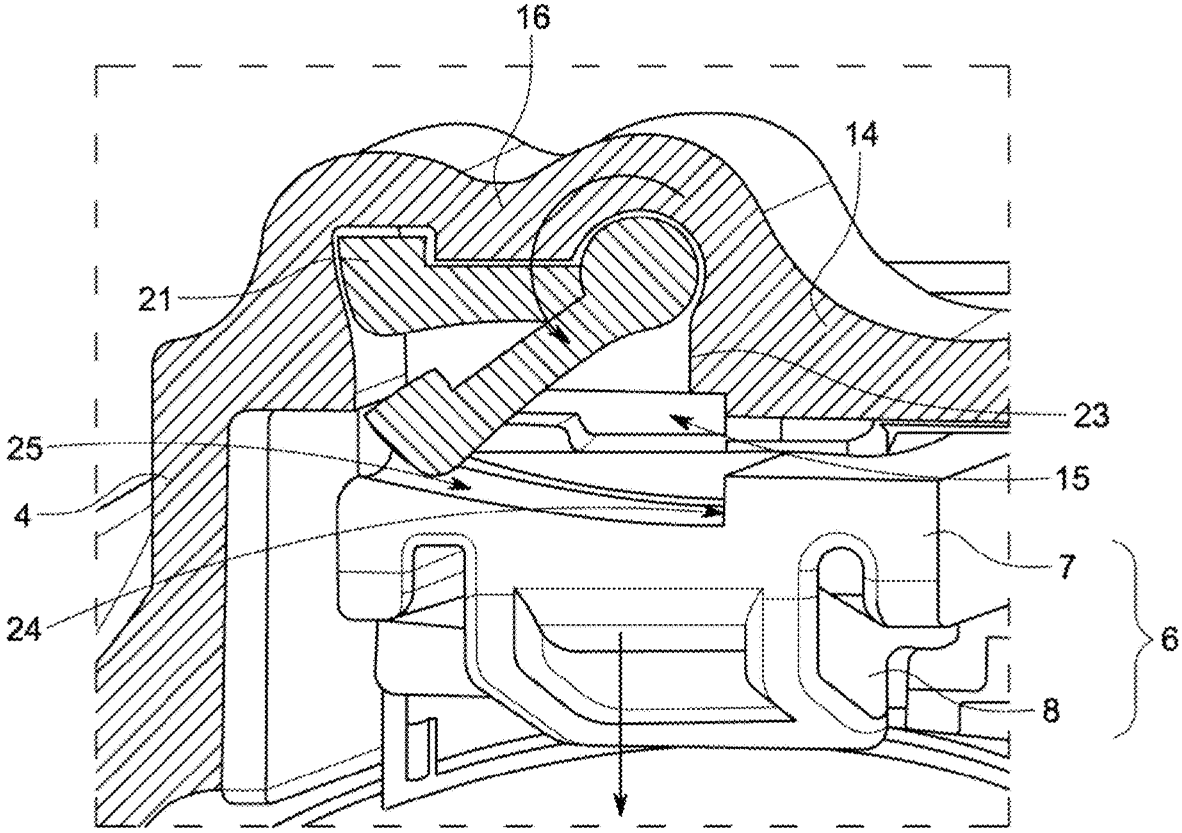
FIG. 7 is an isometric view similar to FIG. 5 but with a different viewing angle according to some embodiments.

The connector housing 5 further has a bridge 14 over the CPA device 4. The bridge 14 has a window 15. The connector housing 5 also has a protecting wall 16 which covers the window 15. The window 15 is closed by the CPA device 4, when the CPA device 4 is in the second position. In other words, the CPA device 4, when in its second position, prevents the key portion 21 from interacting with the locking beam 6. The window 15 is open when the CPA device 4 is in the first position (FIGS. 5 and 7).

The counter-connector 3 includes a counter-connector housing 17 essentially made of molded plastic material. In the illustrated example, the counter-connector housing 17 may also support electromagnetic shield elements (not shown). At least one terminal can be accommodated in the counter-connector housing 17. The example of counter-connector housing 17 which is illustrated is configured for accommodating two terminals, but they are not shown. The lug 13 is formed on an external surface of the counter-connector housing 17. The lug 13 has an inclined surface 18 to facilitate sliding and deformation of the locking portion 10 over the lug 13. The lug 13 also has a locking surface 19 to keep the lug 13 locked in the slot 12, when the connector 2 and counter-connector 3 are assembled.

The connector assembly 1 includes a dedicated tool 20 for disassembling the connector 2 and the counter-connector 3. For example, the dedicated tool 20 is removable from the connector 2. The dedicated tool 20 has a key portion 21. For example, the protecting wall 16 forms a tunnel. The tunnel covers the window 15 and extends longitudinally parallel to the direction of movement M of the CPA device 4. At one end of the tunnel, the protecting wall 16 forms an insertion opening 22. This insertion opening 22 has a shape which is complementary and adjusted to the key portion 21. In other words, the insertion opening 22 is somewhat adjusted to the shape of the key portion 21, so as to prevent a tool different (or sufficiently different, as standard screwdrivers can be) from the dedicated tool 20 from being inserted in this insertion opening 22. Further, the window 15 extends in a plane which is essentially parallel to the direction of movement M of the CPA device 4, that is parallel to the direction of insertion of the key portion 21 below the protecting wall 16. This way, the protecting wall 16 covering the window, it is not possible (or rather difficult) to directly insert in the window 15 a tool different from the dedicated tool 20. However, once inserted in the insertion opening 22, below the protecting wall 16, the key portion 21 can penetrate into the window 15 when the dedicated tool 20 is rotated (see FIGS. 5 and 7).

The protecting wall 16 is configured so that the key portion 21 abuts an edge 23 of the window 15. The upper branch 7 has an inclined surface 25 which slopes downwards in the direction of movement of the key portion 21, when unlocking the primary locking means, so as to facilitate the rotation of the key portion 21. The upper branch 7 also has a stop 24 at the lowest end of the inclined surface 18, on which stop 24, the key portion 21 abuts, when the key portion 21 rotates for unlocking the primary locking means.

For unmating/disassembling the connector 2 from the counter-connector 3 which are mated and secured to each other by primary (locking beam 6) and secondary (CPA device 4) locking means, the following steps are implemented:

- pushing the CPA device 4 from its second to its first position, along the direction of movement M of the CPA device 4; thereby, the secondary locking means are released;
- inserting the key portion 21 of the dedicated tool 20, in the insertion opening 22, below the protecting wall 16, in an insertion direction which is parallel to the direction of movement M of the CPA device 4;
- rotating the dedicated tool 20 about an axis which is parallel to the insertion direction; doing so, the key portion 21 presses on the actuating portion 11 of the lower branch 8; when the actuating portion 11 is pressed downwardly, the lower branch 8 rocks about the pivot portion 9, and the locking portion 10 swings up and releases from the lug 13; therefore, the primary locking means are released; \
- separating the connector 2 and counter-connector 3.

Figure 9:
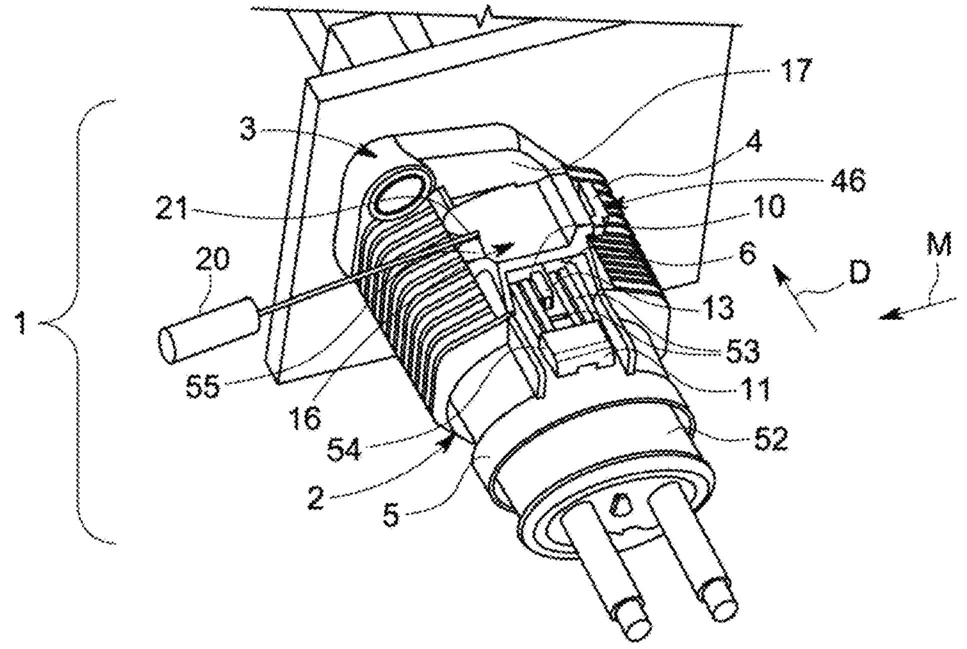
FIG. 9 is an isometric view of another embodiment example of a connector assembly including a connector, a counter-connector, and a dedicated tool according to some embodiments.
Figure 10:
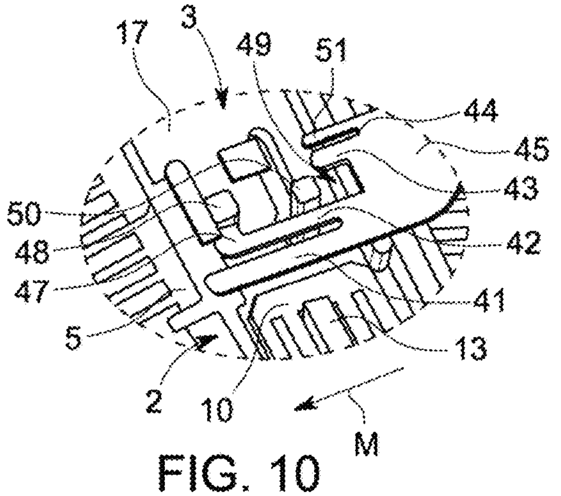
FIG. 10 schematically shows a longitudinal cross section of a portion of the connector assembly shown in FIG. 9, the CPA device being in the first position according to some embodiments.
Figure 11:
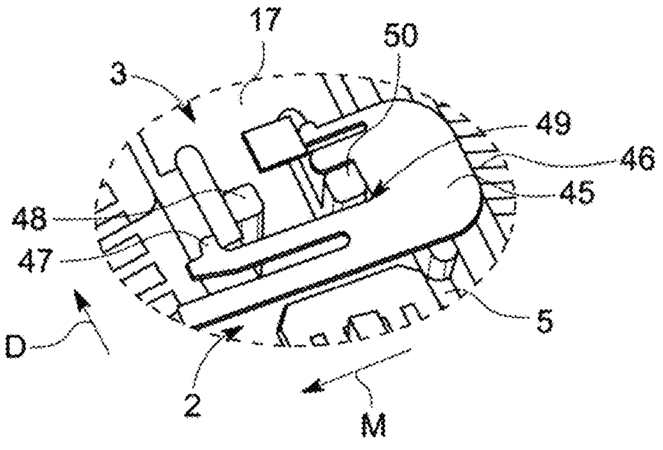
FIG. 11 is similar to FIG. 10, the CPA device being in the second position according to some embodiments.

Another example of an embodiment of a connector assembly 1 is illustrated in FIGS. 9 to 11.

The electrical connector assembly 1 of FIGS. 9 to 11 includes a connector 2 and a counter-connector 3. The connector 2 and the counter-connector 3 are shown as mated in FIG. 9.

For example, the CPA device 4 has one guiding leg 41, one flexible locking leg 42, one blocking leg 43 and one retaining leg 44. These four legs 41, 42, 43, 44 extend perpendicular to the mating direction D of the connector 2 and counter-connector 3. These four legs 41, 42, 43, 44 extend from a flange 45 having an edge forming an actuation end 46. The flexible locking leg 42 has a tooth 47 configured for engaging a first pin 48 protruding from the external surface of the counter-connector housing 17. The tooth 47 prevents the CPA device 4 from being pushed from the first position to the second position as long as the first pin 48 does not engage the tooth 47. But the tooth 47 also prevents the CPA device 4 from being pulled from the second position to the first position as long as it is not shifted with a dedicated tool 20. The flexible locking leg 42 forms locking means of the CPA device 4. The blocking leg 43 delimits, with the flexible locking leg 42, a notch 49 that engages a second pin 50 protruding from the external surface of the counter-connector housing 17, so as to prevent the connector 2 and counter-connector 3 from being unmated. The retaining leg 44 has a tooth 51 preventing the CPA device 4 from being separated from the connector housing 5, when the CPA device 4 is in first position.

As shown in FIG. 11, thanks to the cooperation of the notch 49 with the second pin 50, in the second or final position, the CPA device 4 provides secondary locking means, for locking the connector 2 and the counter-connector 3 to each other. The CPA device 4 cannot be moved from the first position to the second position if the connector 2 and the counter-connector 3 are not properly mated. Indeed, as shown in FIG. 10, the CPA device 4 cannot be moved towards the second position unless the first pin 48 of the counter-connector 3 cooperates with the tooth 47 for deflecting the flexible locking leg 42 of the CPA device 4.

The connector 2 includes a connector housing 5 and the counter-connector 3 includes a counter-connector housing 17 essentially made of molded plastic material. In the illustrated example, the connector housing 5 and the counter-connector housing 17 support electromagnetic shield elements 52. At least one terminal can be accommodated respectively in the connector housing 5 and in the counter-connector housing 17. The example of the connector assembly 1 which is illustrated is configured for accommodating two terminals, but the terminals are not shown.

The connector housing 5 also includes a locking beam 6 providing a primary locking means of the connector 2 and the counter-connector 3 to each other. The locking beam 6 can have various shapes. For example, the locking beam 6 has two lateral branches 53 linked at one longitudinal side by an actuating portion 11, and at one opposite longitudinal side by a locking portion 10. The lateral branches 53 are elastically connected to the connector housing 5. As schematically illustrated in FIG. 9, each lateral branch 53 is hinged on a pivot 54, so that pressing the actuating portion 11 downwards (i.e., toward the connector housing 5) lifts the locking portion 10 that can then be disengaged from the lug 13 protruding from an external surface of the counter-connector 3. Therefore, when the connector 2 and the counter-connector 3 are mated, the locking portion 10 cooperates with an element of the counter-connector 3 for forming primary locking means. When in its second position, the CPA device 4 cooperates with the second pin 50. As for the previous embodiment, the lug 13 has an inclined surface to facilitate sliding and deflection of the locking beam 6. The lug 13 has a locking surface so as to keep the lug 13 locked behind the locking portion 10 when the connector 2 and counter-connector 3 are assembled.

The connector housing 5 also has a protecting wall 16 which covers most of the CPA device 4. Only the actuation end 46 of the CPA device 4 comes out of the connector housing 5 and the protecting wall 16. This actuation end 46 is used for pushing and pulling the CPA device 4 in a direction of movement M which is perpendicular to the mating direction D.

The connector assembly 1 includes a dedicated tool 20. For example, the dedicated tool 20 is removable from the connector 2. The dedicated tool 20 has a key portion 21. For example, the protecting wall 16 has a slot 55 forming an insertion opening which has a shape which is specifically adapted for the insertion of the key portion 21. In other words, the insertion opening 22 is somewhat adjusted to the shape of the key portion 21, so as to prevent a tool different (or sufficiently different, as standard screwdrivers can be) from the dedicated tool 20 from being inserted in this insertion opening. Once inserted in the insertion opening defined by the slot 55, the key portion 21 is tilted and/or pushed so as to push the flexible locking leg 42 (in variants of this embodiment, this flexible locking leg 42 can be a different one, i.e. different from the one blocking the CPA device 4 in the first position) both in the disassembling direction (i.e. opposite to the mating direction D) and in a transversal direction (i.e., parallel to the direction of movement M of the CPA device 4) so as to move the CPA device 4 from the second position to the first position. One can notice that when the tooth 47 has been shifted behind the first pin 48, an operator can use the actuation end 46 for pulling the CPA device 4 from the second to the first position.

For unmating/disassembling the connector 2 from the counter-connector 3 which are mated and secured to each other by primary and second locking means, the following steps are implemented:

- inserting the key portion 21 of the dedicated tool 20, in the insertion opening, below the protecting wall 16, in an insertion direction which is parallel to the direction of movement M of the CPA device 4;
- shifting the tooth 47 in a direction parallel and opposite to the mating direction D;
- pushing the CPA device 4 from its second to its first position with the dedicated tool 20 and pulling the actuation end 46, along the direction of movement M of the CPA device 4; thereby, the secondary locking means are released;
- pressing the actuating portion 11 downwardly so as to move the locking portion 10 up; thereby, the primary locking means are released;
- separating the connector 2 and counter-connector 3.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "includes," and/or "including," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

The invention claimed is:

1. A high-power electrical connector assembly, comprising:

a connector; and a counter-connector, the connector and the counter-connector being configured to be mated together, the connector including a connector housing for accommodating at least one terminal and a secondary locking device, wherein the connector housing includes a locking beam providing a primary locking means for locking the connector and the counter-connector to each other, and wherein the secondary locking device is movable, along a direction of movement, between a first position and a second position, the secondary locking device providing, when in its second position, a secondary locking means of the connector and the counter-connector to each other, wherein the electrical connector assembly comprises a dedicated tool for disassembling the connector and the counter-connector, wherein at least one of the primary and secondary locking means are at least partially covered by a protecting wall, the protecting wall being configured so as to have an insertion opening, and wherein the insertion opening has a shape complementary, adjusted and configured for a key portion of said dedicated tool to be inserted therein, in that the secondary locking device is a CPA device, and in that, when in its second position, the CPA device prevents the key portion from interacting with the locking beam.

2. The electrical connector assembly according to claim 1, wherein said dedicated tool is removable from the connector.

3. The electrical connector assembly according to claim 1, wherein the connector housing includes a bridge over the CPA device, the bridge having a window to allow the key portion to interact with the locking beam and a protecting wall covers the window so as to prevent a tool different from said dedicated tool from being directly inserted in said window.

4. The electrical connector assembly according to claim 3, wherein the protecting wall forms a tunnel covering the window and extending longitudinally parallel to the direction of movement of the CPA device, the insertion opening being located at an end of the tunnel.

5. The electrical connector assembly according to claim 1, wherein the dedicated tool is rotatable about a rotation axis which is parallel to the direction of movement of the CPA device.

6. The electrical connector assembly according to claim 1, wherein the locking beam comprises a pivot portion, a locking portion and an actuating portion, respectively located on opposite sides of the pivot portion the pivot portion being configured so that the locking portion disengages from a lug formed on the counter-connector, when the key portion of the dedicated tool presses the actuating portion.

7. A process for unmating a high-power connector from a counter-connector secured to each other by primary locking means and secondary locking means, the primary locking means including a locking beam, the process comprising a step of inserting along an insertion direction, a dedicated tool having a key portion, into an insertion opening made in the connector, wherein the secondary locking means are formed by a CPA device, and comprising the steps of:

moving a CPA device, along a direction of movement, between a second position and a first position, the CPA device providing, when in its second position, a secondary locking means of the connector and the counter-connector to each other; and unlocking the primary means with said dedicated tool, when the CPA device is in the first position.

8. The process according to claim 7, wherein the step of unlocking with said dedicated tool the primary locking means comprises rotating the dedicated tool about a rotation axis parallel to the insertion axis, so that the dedicated tool interacts with the primary locking means for unlocking the connector and the counter-connector.

* * * * *